(12) United States Patent
Porat-Stoler et al.

(10) Patent No.: US 11,372,555 B2
(45) Date of Patent: Jun. 28, 2022

(54) RECONSTRUCTING DATA IN A SMART STORAGE ARRAY

(71) Applicant: International Business Machines Corporation, Armonk, NY (US)

(72) Inventors: Asaf Porat-Stoler, Ramat Gan (IL); Constantine Gavrilov, Rishon le-Zion (IL); Christopher M. Dennett, Houston, TX (US); Rivka Mayraz Matosevich, Zichron Ya'acov (IL); Sergey Marenkov, Tel Aviv (IL); Jonathan Fischer-Toubol, Tel Aviv (IL); Afief Halumi, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 16/750,723

(22) Filed: Jan. 23, 2020

(65) Prior Publication Data

US 2021/0232324 A1 Jul. 29, 2021

(51) Int. Cl.
*G06F 11/07* (2006.01)
*G06F 3/06* (2006.01)
(Continued)

(52) U.S. Cl.
CPC .......... *G06F 3/0619* (2013.01); *G06F 3/0653* (2013.01); *G06F 3/0659* (2013.01);
(Continued)

(58) Field of Classification Search
CPC .... G06F 3/0619; G06F 3/0653; G06F 3/0659; G06F 3/0689; G06F 11/1092; G06F 11/2094; G06F 11/1076
See application file for complete search history.

(56) References Cited

U.S. PATENT DOCUMENTS 7,788,541 B2 * 8/2010 Shellhamer ......... G06F 11/1076
714/42
9,189,311 B2 11/2015 Li et al.
(Continued)

FOREIGN PATENT DOCUMENTS

CN 101251812 A 8/2008

OTHER PUBLICATIONS

Xie, P., Huang, J., Qin, X., & Xie, C. (2017). SmartRec: Fast Recovery from Single Failures in Heterogeneous RAID-Coded Storage Systems. The Computer Journal, 61(6), 896-911.
(Continued)

*Primary Examiner* — Matthew M Kim
*Assistant Examiner* — Kyle Emanuele
(74) *Attorney, Agent, or Firm* — Patterson + Sheridan, LLP (57) ABSTRACT

A method and system may reconstruct data in a smart storage array where upon detection of data inconsistency, an application of the system is notified and affected data strips are rebuilt. When an initiator detects stripe corruption, the initiator may report the strip corruption to storage. The storage may lock the strip for I/O operations. Initiators may determine recovery scenarios for rebuilding the data strips and send the scenarios to storage. At storage, initiator replies may be collected, and a rebuild option with the highest votes may be automatically determined for a reconstruction operation. Once the reconstruction operation is completed, the rebuilt stripe may be unlocked and data operations may recommence.

17 Claims, 6 Drawing Sheets

(51) Int. Cl.
  *G06F 11/20* (2006.01)
  *G06F 11/10* (2006.01)

(52) U.S. Cl.
  CPC ........ *G06F 3/0689* (2013.01); *G06F 11/1092* (2013.01); *G06F 11/2094* (2013.01)

(56) References Cited

U.S. PATENT DOCUMENTS

| | | |
|---|---|---|
| 9,946,607 B2 | 4/2018 | Sundararaman et al. |
| 9,990,261 B2 | 6/2018 | Blount et al. |
| 2008/0010503 A1* | 1/2008 | Cashman ............ G06F 11/1092 714/6.12 |
| 2014/0025990 A1* | 1/2014 | Akutsu ................ G06F 3/0619 714/6.22 |
| 2016/0110249 A1* | 4/2016 | Orme ................ G06F 11/1016 714/6.24 |
| 2017/0192865 A1 | 7/2017 | Pan |
| 2019/0129795 A1* | 5/2019 | Xu ...................... G06F 11/2094 |
| 2020/0117534 A1* | 4/2020 | Yurzola ................ G06F 3/0683 |

OTHER PUBLICATIONS

Disclosed Anonymously,"Smart selection of array rebuild type in storage system," May 16, 2016, IPCOM000246193D, 7 pages.

* cited by examiner

RECONSTRUCTING DATA IN A SMART STORAGE ARRAY

BACKGROUND

The present invention relates to computer memory storage, and more particularly to fix or replace corrupted data blocks within a storage array.

A storage array, also called a disk array, is a data storage system that is used for block-based, file-based, or object storage. The term is used to describe dedicated storage hardware that includes at least one of spinning hard disk drives (HDDs) and solid-state disk drives. Arrays include controllers that provide a level of abstraction between an operating system and physical drives. The controller can access copies of data across physical devices, and can take the form of a PCI or PCI Express card designed to support a specific drive format.

Storage controllers in storage arrays can provide data protection by using redundant copies of data. Corrupted RAID strips can occur due to software or hardware problems within a storage array. Enterprise storage is expected to be self-healing. Various redundant array of independent disks (RAID) protection schemes exist, such as using multiple copies of the same data, using striping, and checksumming. A typical storage array includes a RAID stripe comprising data blocks, or strips, as well as checksums.

Checksums can allow storage arrays to verify the accuracy of block reads. However, the complexity of modern storage arrays that use storage virtualization, encryption, compression and deduplication limit the feasibility of the technique. When data is deduplicated and compressed, different blocks and different checksums (e.g., differing from those supplied by an initiator) can be used by the storage array. This disparity can result in an incorrect checksum indication, i.e. the storage may think the data is correct, while the application will see corrupt data. Furthermore, the data misplacement can only be detected via application tags on a storage array that implements deduplication and compression, and storage array has no knowledge of the application tag meaning. As a result, detecting corrupted data strip by the storage array, itself, is a challenge, especially when storage implements a virtualization, even if it uses its own checksum tags, overlaying them with the tags of the initiator.

Storage arrays may implement a scrubbing technique for detecting and correcting data inconsistencies. During scrubbing, the storage array does reads of its allocated stripes, and checks whether data strips of each stripe are identical (when mirroring is used) or whether they would generate correct checksum strip. If the data strips are not identical or recomputed checksum values for the data strips of a stripe do not match the checksum strip of the stripe, an inconsistency is detected. The storage array may then declare affected stripe as a series of bad blocks, or may try to repair the inconsistency. However, the storage array can be unaware of which actual strip is corrupted and may make an arbitrary decision as to which strip to reconstruct. On the application side, scrubbing techniques are unaware of the storage internal mechanism and cannot make a corrective action without discarding the block. Also, the use of application assisted scrubbing as a proactive measure is expensive due to resource constraints on the initiator and storage sides.

SUMMARY

According to one embodiment of the present invention, a method of rebuilding a storage block may include determining at a storage controller a data inconsistency in a storage array. The method may include communicating the data inconsistency from the storage array to an initiator of a host system and rebuilding the storage block.

According to another particular embodiment, a method of rebuilding a storage block includes determining, at an initiator of a host, a data inconsistency in a storage array. The method may include generating a rebuild option at the initiator, communicating the rebuild option to a storage controller, and rebuilding the storage block.

According to another particular embodiment, a method of rebuilding a storage block includes determining a data inconsistency within a storage array. The determination is made at an initiator of a host or a storage controller of the storage array. The method may include generating a rebuild option at the initiator, and rebuilding the storage block.

DETAILED DESCRIPTION

An embodiment of a system may be configured to detect and reconstruct corrupted data blocks within a smart storage array. Detection of a data inconsistency may occur within an application or a storage array. When the storage array detects an inconsistency, the storage array may notify the application. Once application is aware of the inconsistency, the application may instruct the storage array to rebuild affected data strips.

An embodiment of a system may reconstruct data in a smart storage array where upon detection of data inconsistency, an application of the system is notified and affected data strips are rebuilt. When an initiator detects a stripe corruption, the initiator may report the strip corruption to storage. The storage may lock the strip for I/O operations and the stripe for updates. Initiators may determine recovery scenarios for rebuilding the data strips and send the scenarios to storage. At storage, initiator replies may be collected, and a rebuild option with the highest votes may be automatically determined for a reconstruction operation. Once the reconstruction operation is completed, the rebuilt stripe may be unlocked and data operations may recommence.

During detection, an application of an embodiment of the system may detect a validity of each strip by performing an internal consistency check. In certain configurations, a storage controller may detect an inconsistency within a stripe by performing a scrubbing operation. That is, the storage controller of an embodiment of the system may read all strips of the stripe and perform parity validation, or comparing of redundant copies.

In the case of storage assisted detection (e.g., stripe granularity only), the storage controller may do periodic scrubbing to check for data inconsistencies. When a storage controller detects a data stripe inconsistency, the storage controller may notify all initiators that map the affected volume with an asynchronous event (e.g., SENSE code). The asynchronous event may include information, such as a notification code (e.g., STRIPE_CSUM_ERROR). Other included information may comprise a logical unit number (LUN) ID or a volume universally unique identifier (UUID). A volume UUID valid indicator may also be included along with a first logical block address (LBA) of the volume that belongs to the LUN, as well as a strip identifier (ID) of the LBA and a size of an affected volume range in sectors. The information may further include a number of strips within a stripe and a bitmap of online (e.g., not failed) strips within the stripe.

The notification may be sent only once for each strip or to all initiators that map the strip or part of the strip. In cases, where storage layout is such that entire stripe is used by one or more volume exposed to initiators, a single event for the entire stripe can be raised for affected initiators. This can be the case when no deduplication is used, or when deduplication block size is equal to stripe size.

The notification may be further limited to initiators that indicate support for rebuild protocol capability during initiator login. Alternatively, all events may be sent to one or more initiators set in the storage configuration. In this scenario, the event may specify a volume UUID and have a volume UUID valid indicator set.

In the case of application assisted detection, the application may detect a corrupted strip by reading strip data and doing an internal application data consistency check. When the application receives the STRIPE_CSUM_ERROR event, the application may perform a read of the reported LBA range and validate its consistency from the application perspective. When a read operation detects a corrupted block, the initiator may invoke a protocol for data correction. The read operation may detect a corrupted block because of handling the STRIPE_CSUM_ERROR event or because of routine application read.

When a corrupted strip is rebuilt according to an embodiment of a method, the application may request a rebuild of corrupted data by using RECONSTRUCT_READ and RECONSTRUCT_WRITE target commands. The RECONSTRUCT_READ command may be used to perform a reconstructed read of the requested LBA range from other data strips of the stripe. Such may be the case when it is not known whether other data strips have valid data. The command may return rebuilt data that may be validated by the application.

The RECONSTRUCT_READ command may include at least the following parameters: a command code (STRIP_RECONSTRUCT_READ), a LUN ID or volume UUID, and a volume UUID valid indicator. As with the other commands explained herein, if the volume UUID is not set, the LUN ID may be used. The parameters may additionally include a starting LBA, a size of an affected data block in sector units, a reconstruct sequence, and an authentication lock key. A reconstruct sequence may specify which additional strip may be discarded when reconstructing data. A value of 0 may indicate a first strip in the remaining set of strips, whereas a value of 1 may indicate a second strip in the remaining set of strips, and so on.

Upon successful execution, the command may place the read data at the buffers supplied by the application. The application may further examine the data. In a case when the application detects incorrect data, the application may retry the RECONSTRUCT_READ command with an incremented reconstruct sequence.

The RECONSTRUCT_WRITE command may be used to write the reconstructed data to the stripe and to update stripe parity strips. The RECONSTRUCT_WRITE command may be used upon a successful RECONSTRUCT_READ command and a successful validation of returned data. Alternatively, the RECONSTRUCT_WRITE command may be used upon a detection of a corrupted read block, when it is known that a deployed RAID scheme allows only a single strip loss within a stripe.

The RECONSTRUCT_WRITE command may specify at least the following data parameters: command code (e.g., STRIP_RECONSTRUCT_WRITE), LUN ID or volume UUID, volume UUID valid indicator (if not set, the previous field is the LUN ID), starting LBA, the size of the affected data block in sector units, a reconstruct sequence, and an authentication lock key. The command parameters may be identical to the RECONSTRUCT_READ command. If only a single strip may be lost in data stripe, the reconstruct sequence field may be ignored.

Upon successful completion of the command, the storage controller may reconstruct the specified blocks and update both the strip and the parity. The initiator may also supply the reconstructed data obtained with previous RECONSTRUCT_READ command. If full strip data is supplied, the storage controller may not need to recalculate the strip. Depending on the implementation details and recovery mechanism, the storage controller may choose to recalculate the strip.

An embodiment of the system may include locking features. For example, a locking scheme may be used when multiple volumes and multiple initiators own a stripe. Such a scenario may additionally factor in when a decision for the reconstruction scheme is delegated to multiple initiators.

The locking mechanism may enable an initiator to lock a given stripe for exclusive access. The mechanism can be similar to SCSI reservations and may allow lock removal for cases when initiators unexpectedly die. Lock removal may be automatic (e.g., time based or in response to an initiator disconnect or logout) or per request from another initiator. An embodiment of the lock may take place implicitly, after a first reconstruct command to a non-locked stripe.

When a lock is obtained for a given stripe, all READ and WRITE commands are blocked (e.g., queued) or returned with BUSY status. RECONSTRUCT_READ and RECONSTRUCT_WRITE commands from other initiators may be failed with an appropriate status.

Locking and unlocking the stripe may be done with the help of a storage command that includes at least the following arguments: a command code (e.g., STRIP_RECONSTRUCT_LOCK or STRIP_RECONSTRUCT_UNLOCK), a LUN ID or volume UUID, a volume UUID valid indicator (as described herein), the starting LBA, the size of affected data block in sector units, and an authentication lock key.

Regarding size and alignment considerations, the deduplication block of an embodiment of the system may not be less than the sector size. Similarly, the strip size may not be less than sector size. A volume block allocation policy may allocate according to strip size, so that all data ranges of a given strip belong to a volume at least in the absence of deduplication. According to particular embodiment, block size may be equal to the strip size, and all deduplicated volume chunks may be aligned to deduplication block size. Both values in one implementation may be equal or be a multiple of the physical sector size. The physical sector size may represent a real sector size of the used hard drives and may be above or equal to a logical sector size reported by storage controller to the initiators (e.g., 4 or 8 KiB vs 512 bytes).

In some implementations, different parts of the same strip may belong to different volumes due to deduplication and alignment issues. In such a scenario, the storage controller may send multiple messages for parts of the same strip and use correct starting LBA and affected range size for each affected volume. Multiple applications may be delegated to make decisions about recovery of the same strip. In such a case, not all applications may make the same decision about how the strip may be recovered. As such, the system may make a heuristic decision to delegate each strip correction only to a single volume.

Alternatively, heuristics may be developed to collect decisions about rebuild scenarios for each affected volume and to choose the best solution. More particularly, the initiator may be unable to make a decision for the case of initiator-driven detection and recovery when an alignment recommendation is broken. That is, the initiator may be unable to determine whether an inconsistent block belongs to a single strip or not. To resolve a possible alignment issue for initiator-driven recovery, the storage controller may reply with an error to RECONSTRUCT_READ or RECONSTRUCT_WRITE command when alignment constraints are violated, and may raise a described sense code/asynchronous event—STRIPE_CSUM_ERROR—for all affected strips.

The initiator may then proceed with checking and validation of each reported block. Once an application detects that a corrupted block consists of two or more strips, the application may need to perform multiple RECONSTRUCT_READ requests to choose a correct reconstruct sequence.

According to a particular embodiment of the system, reconstruct read and reconstruct write commands may return error codes when a requested range is above strip size. This may result in an invalid request error code due to only sizes of up-to strip size being allowed.

Other error codes may result when a requested range crosses a strip boundary. An invalid request error may be raised, and asynchronous events/sense codes (e.g., STRIPE_CSUM_ERROR) that provides information for all affected strips and stripes may be emitted. The storage controller may validate all stripes affected by the command to determine which stripes raise the STRIPE_CSUM_ERROR code. Alternatively, the storage controller may delay revalidation until a reconstruct command is obtained.

Other reconstruct read and reconstruct write commands may return error codes when requested commands result in no data change. In this scenario, no inconsistency may be found in the stripe, as affected by the command. Appropriate error STRIPE_CSUM_OK may be raised in this case. This may occur where perceived corruption may not be resolved by a rebuild because the stripe is consistent, or when other initiators have already resolved the corruption. When an initiator receives this code, the initiator may retry the read operation, if the original error was triggered on the initiator. Otherwise, the initiator may abort the rebuild/recovery procedure, when the recovery was initiated due to a previous event from the storage controller.

Reconstruct read and reconstruct write commands of another embodiment of the system may return error codes when a requested command cannot complete due to read or write errors. The error code and additional error data may provide information for read or write errors.

Still other reconstruct read and reconstruct write commands may return error codes when requested commands cannot complete because the stripe is locked. As such, the STRIPE_CSUM_LOCKED error code may be raised. Additional error data may provide initiator information that locks the stripe and the lock key value.

A particular embodiment may implement storage side recovery based on initiator advice. Such an implementation may be useful in complex alignment situations. Another implementation may occur when one initiator out of many that maps the block may not make an unequivocal decision about the recovery sequence. In either scenario, an initiator may check multiple recovery sequences to determine all recovery sequences that pass data integrity checks. The results may be communicated to the storage controller. The storage controller may then determine a recovery sequence that has the most votes.

In this manner, the storage recovery scheme initiated by the storage side may have the following flow. The storage controller of an embodiment of the system may initiate the recovery scheme by emitting STRIPE_CSUM_ERROR event, to all affected initiators in response to an inconsistent stripe being detected. Input/Outputs (I/Os) on the affected stripe may be suspended until recovery is complete.

The system may wait for replies generated from all initiators. The replies may include votes comprising determinations/recommendations for promising recovery sequences generated by each initiator. Logged out or disconnected initiators may be dropped from the waiting list.

The storage controller may determine the recovery sequence that has the most votes and reconstruct data according to that recovery sequence. The storage controller may emit a STRIPE_REBUILD_OK event for all affected initiators. The system may allow I/O on the rebuilt stripe.

Both an initiator and a storage controller can detect a stripe inconsistency. If an initiator detects an inconsistency, the initiator may send a STRIPE_REBUILD_REQUEST command that has a structure that mirrors a STRIPE_CSUM_ERROR event. The command code (STRIPE_REBUILD_REQUEST) may include an LUN ID or volume UUID, as well as a volume UUID valid indicator. As with the other commands explained herein, if the volume UUID is not set, the LUN ID may be used. The command may also include a first LBA of the volume that belongs to the LUN, and a size of the affected volume chunk in sectors. In response to the command, the storage controller may either send a STRIPE_CSUM_ERROR event to all affected initiators or send a STRIPE_CSUM_OK error reply.

The reply to STRIPE_CSUM_ERROR event is a command that may include the fields: command code (STRIPE_REBUILD_ADVICE), a LUN ID or volume UUID, a first LBA of the volume within the affected range, a size of affected range in sectors, a highest reconstruct sequence that results in a validated rebuild, and a bitmap of reconstruct sequences that may result in validated rebuild. Most of the fields may be taken from a STRIPE_CSUM_ERROR event.

The reconstruct information (e.g., a number of highest sequence and valid reconstruct sequences) may be determined by the initiator from the STRIPE_CSUM_ERROR event. Each initiator may test all possible reconstruct sequences (even if it does not sense a problem in the reported range) using RECONSTRUCT_READ commands.

The initiators may then report the aggregated result of good sequences that pass data validation.

The asynchronous event, or sense STRIPE_REBUILD_OK, may have a structure that includes the following fields: a notification code (e.g., STRIPE_REBUILD_OK), a LUN ID or a volume UUID, a volume UUID valid indicator (e.g., if not set, the LUN ID may be used), a first LBA affected, and a size of affected range in sectors.

The STRIPE_REBUILD_OK event may be sent to all initiators that map the volume and allow waiting applications to retry I/O transactions. In that scenario, the LUN ID may specify the mapped volume. Alternatively, the event may be sent to a list of initiators defined in the storage controller configuration. The volume UUID field may be set, and volume UUID valid indicator may be present. Each event may identify a volume and a data slice within that volume that has changed during the rebuild procedure.

A particular embodiment of the system may rebuild a block with initiator assistance by informing one or more initiators about a data range inconsistency within a volume. In one scenario, the inconsistency may be found by a storage controller during a scrub or a rebuilding operation in the data array. In another scenario, the initiator may detect an inconsistency within a strip that it has mapped.

In the instance where the initiator has detected the inconsistency, the initiator may instruct the storage controller to initiate rebuilding a stripe. For example, the initiator may instruct the storage to rebuild the stripe from a specific subset of strips that belong to the stripe. The initiator may send the instruction after finding out which subset of strips passes validation by the initiator.

The initiator may detect the data inconsistency during read or scrubbing operation on a read volume and send a stripe rebuild request. One or more initiators may be notified about the rebuild event.

I/O operations may be suspended during the block rebuild. Reservation locks may be used to prevent multiple initiators from rebuilding the same stripe at the same time. Each affected initiator may reply to the storage controller with a list of possible rebuild scenarios. The storage controller may select an option with the highest vote tally. Initiators may send read and write I/O commands that instruct a storage array to simulate or deploy a rebuild scenario. This feature may enable applications to test and select a rebuild option.

Figure 1:
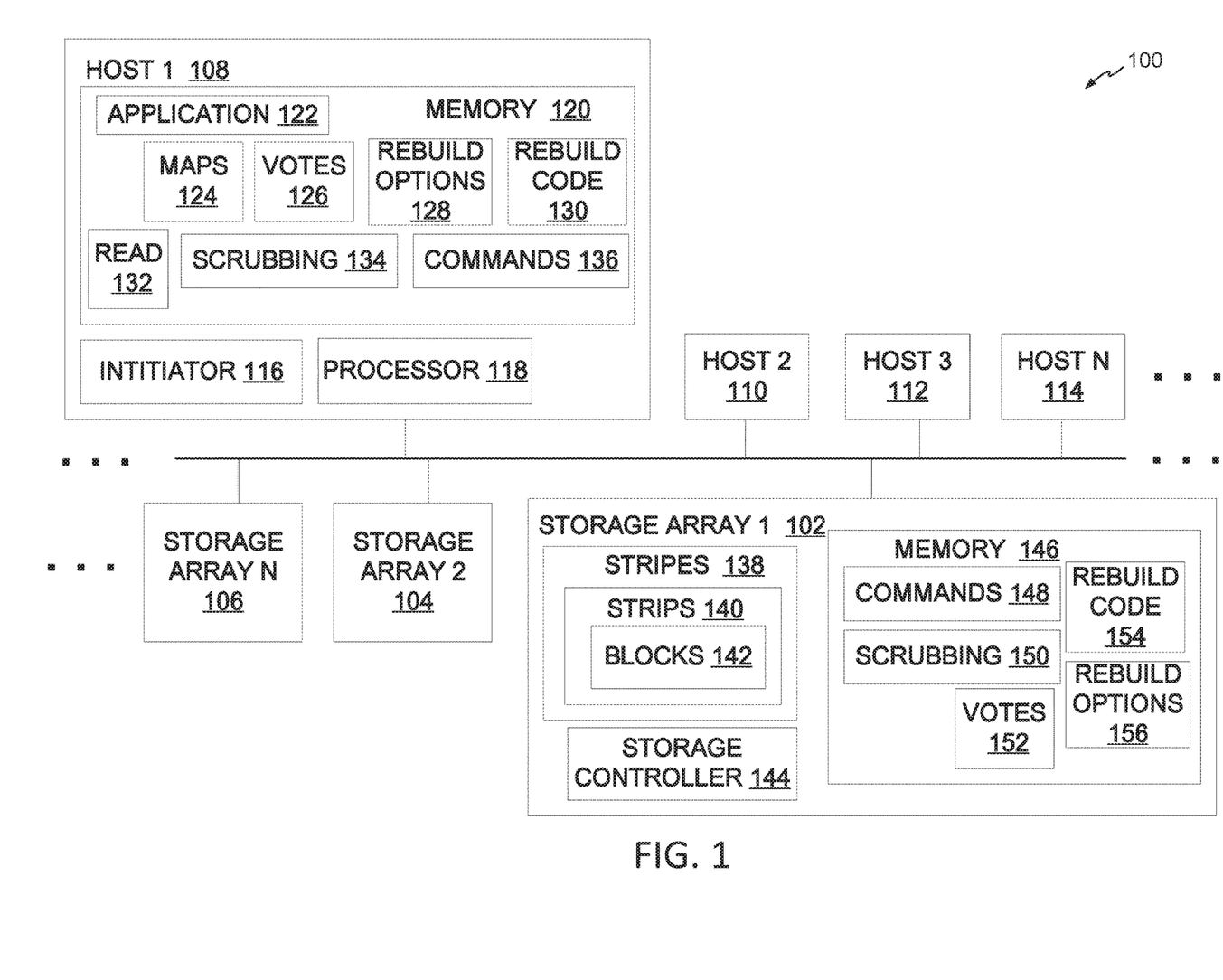
FIG. 1 is block diagram of an embodiment of a system configured to rebuild a stripe with initiator assistance by informing one or more initiators about a data range inconsistency within a stripe of an array.

FIG. 1 is block diagram of an embodiment of a system 100 configured to rebuild a strip with initiator assistance by informing one or more initiators about a data range inconsistency within a stripe of an array. An embodiment of the system 100 includes storage arrays 102, 104, 106. The system 100 also includes host computers 108, 110, 112, 114.

Host computer one 108 is shown with internal components to illustrate those present in the other hosts 110, 112, 114. The host computer 108 includes an initiator 116 and a processor 118. A memory 120 includes an application 122, as well as maps 124, votes 126, rebuild options 128, and rebuild code 130. The memory 120 also includes a read operation 132, a scrubbing module 134, and commands 136.

Storage array one 102 is shown with internal components to illustrate those present in the other storage arrays 104, 106. The storage array 102 includes stripes 138, as well as strips 140 and blocks 142. The storage array 102 includes a storage controller 144 and a memory 146. The memory 146 includes commands 148, a scrubbing algorithm 150, and accumulated votes 152. The memory 146 also includes a rebuild code module 154 and rebuild options 156.

Figure 2:
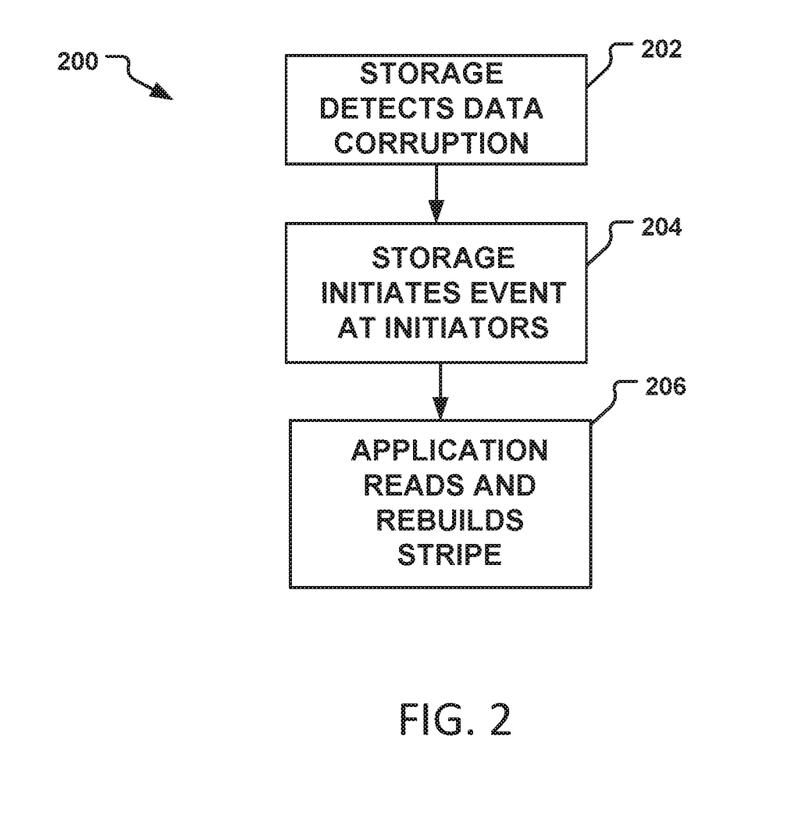
FIG. 2 is a flowchart of an embodiment of a method of rebuilding a block with initiator assistance by informing one or more initiators about a data range inconsistency within a stripe of an array.

FIG. 2 is a flowchart of an embodiment of a method 200 of rebuilding a strip at a storage array with initiator assistance by informing one or more initiators about a data range inconsistency within a stripe of the array.

At 202, a storage controller of an embodiment of the system may detect a data corruption within a stripe during scrubbing or rebuild. The storage controller at 204 may initiate an event at all affected initiators in response to the inconsistent stripe being detected. The command may include a stripe ID, a volume ID and an LBA range. An application may read and rebuild the stripe at 206.

Figure 3:
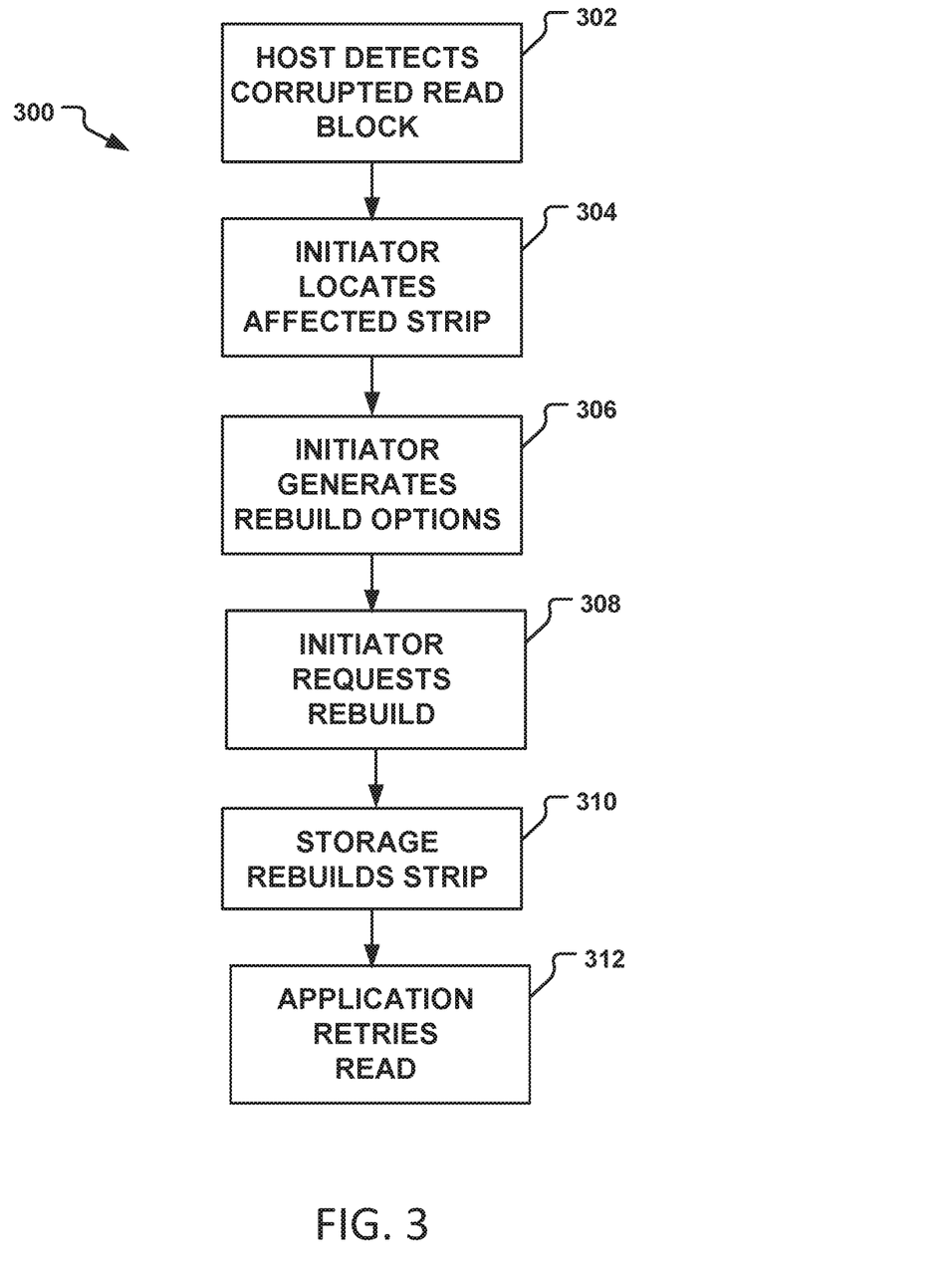
FIG. 3 is a flowchart of an embodiment of a method initiated on an application and initiator level, the method including rebuilding a stripe of a storage array.

Both an initiator and a storage controller of different embodiments may detect a stripe inconsistency. For example, FIG. 3 is a flowchart of an embodiment of a method 300 initiated on an initiator level, the method 300 including rebuilding a stripe of a storage array. The initiator (e.g., a host against a storage system or grid service against a backend) may detect at 302 a corrupted read block.

At 304, the initiator may attempt to find the affected strip. The initiator(s) may consult at 306 the storage about several rebuild scenarios for the stripe to which the block belong. Such may be the case when the block spans more than one strip, or if several rebuild scenarios exist for a single strip. The replies may include votes comprising determinations/recommendations for promising recovery sequences generated by each initiator.

The initiator may request at 308 the storage to rebuild a specific strip within a stripe, using a specified scenario. The storage may rebuild the strip at 310 from other strips of the stripe according to the requested scenario. The storage may reply at 312 to the application, and the application may retry the read operation.

Figure 4:
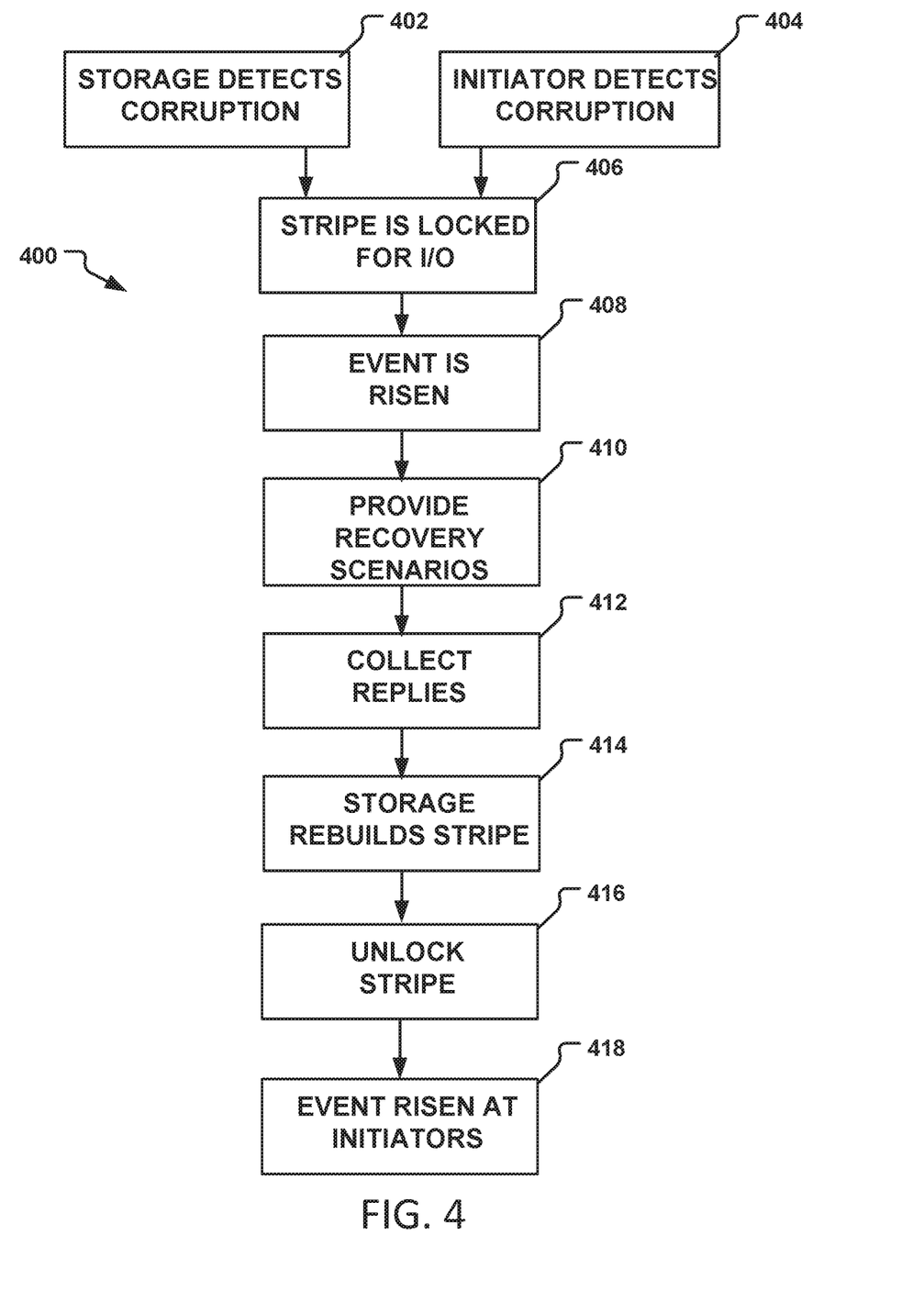
FIG. 4 is a flowchart of an embodiment of a method of rebuilding a stripe of a storage array using corroborative processes of the storage array and initiator.

FIG. 4 is a flowchart of an embodiment of a method 400 of rebuilding a stripe of a storage array using corroborative processes of the storage array and initiator. At 402, the storage array may detect a data corruption within a stripe during scrubbing or rebuild. Alternatively at 404, the initiator may detect a stripe corruption and report it to the storage.

The stripe may be locked at 406 for I/O operations. An event is risen at 408 (e.g., a SENSE or a protocol asynchronous message) to a set of initiator with a stripe ID, a volume ID, and an LBA range.

Initiators at 410 may try recovery scenarios and report to storage with a set of valid rebuild scenarios, using a new command. The recovery scenarios (e.g., a number of highest sequence and good reconstruct sequences) may be determined by the initiators. Each initiator may test all possible reconstruct sequences (even if it does not sense a problem in reported range) using RECONSTRUCT_READ commands. The initiators may then report the aggregated result of good sequences that pass data validation.

Storage at 412 may collect initiator replies and automatically determine a rebuild option with the highest vote total. The storage controller may wait for replies generated from all initiators. The replies may include votes comprising determinations/recommendations for promising recovery sequences generated by each initiator. Logged out or disconnected initiators may be dropped from the waiting list. The storage controller may determine the recovery sequence that has the most votes and reconstruct data according to that recovery sequence.

The storage may rebuild the stripe at 414. For example, the storage controller may emit STRIPE_REBUILD_OK event for all affected initiators. The system may allow I/O on the rebuilt stripe. The stripe may be unlocked at 416, and an event may be risen to initiators at 418.

As explained herein, I/O operations may be suspended during the block rebuild. Reservation locks may be used to prevent multiple initiators from rebuilding the same stripe at the same time. Each affected initiator may reply to the storage controller with a list of possible rebuild scenarios. The storage controller may select an option with the highest vote tally. Initiators may send read and write I/O commands that instruct a storage array to simulate or deploy a rebuild scenario. This feature may enable applications to test and select a rebuild option.

Figure 5:
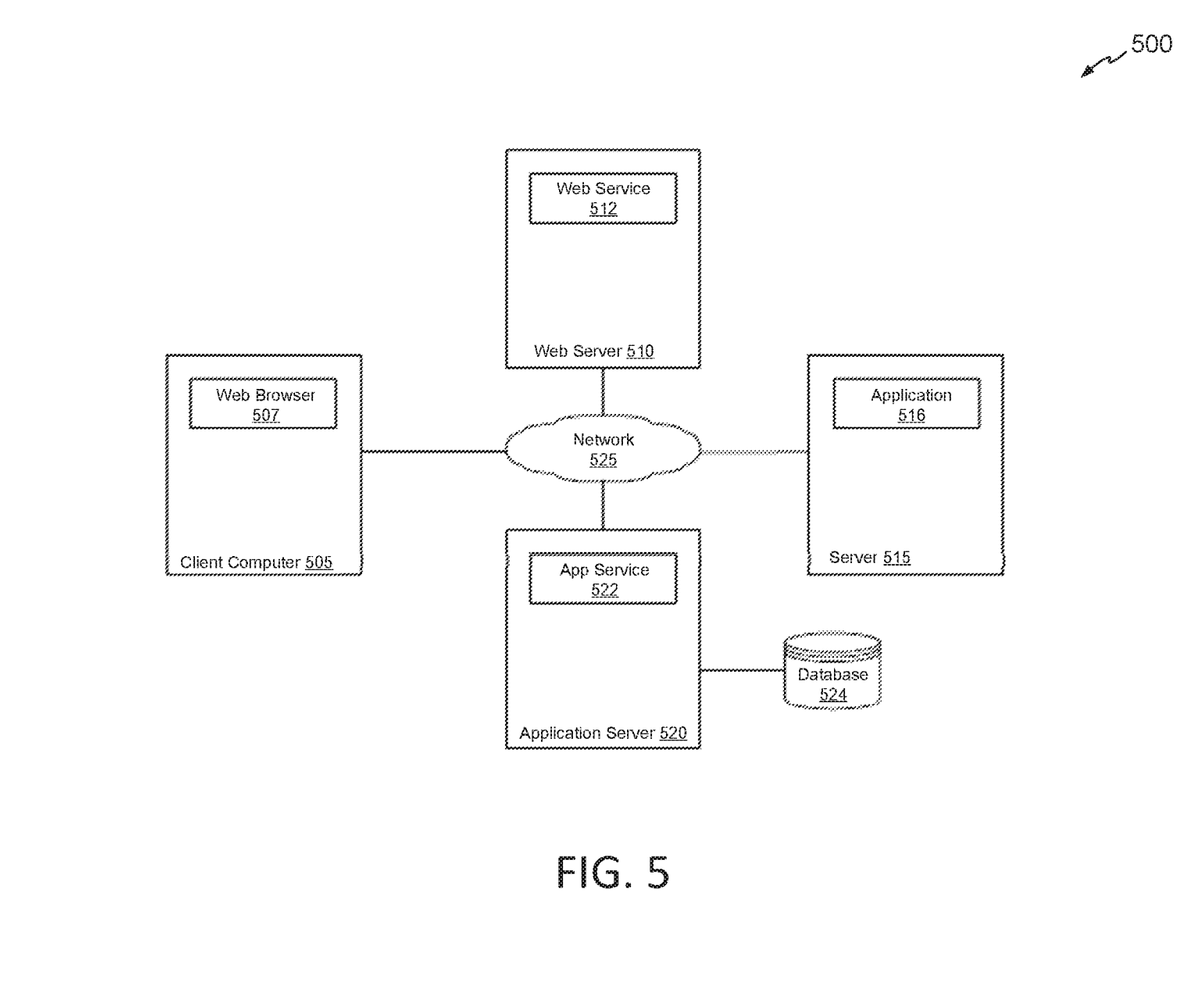
FIG. 5 shows a block diagram of a computing system in accordance with an embodiment.

FIG. 5 illustrates another example computing system according to one embodiment, such as may be realized using a networked environment. As shown, the computing environment 500 includes a client computer 505, a web server 510, a server 515, an application 516, and an application server 520. The client computer 505 may be a physical system (e.g., a desktop, laptop computer, mobile device, etc.) or a virtual computing instance executing in the cloud. The client computer 505 includes a web browser 507. A user may access data services through the web browser 507 over a network 525 (e.g., the Internet).

For instance, a user may access a web service 512 executing on a web server 510. In one embodiment, the web service 512 provides a web interface for an application server 520 (e.g., executing an application service 522). More specifically, the application service 522 provides a database 524. The database 524 may comprise part of a storage array accessed by the application service 522. The database 524 may include data presented to users on the web browser 507.

Figure 6:
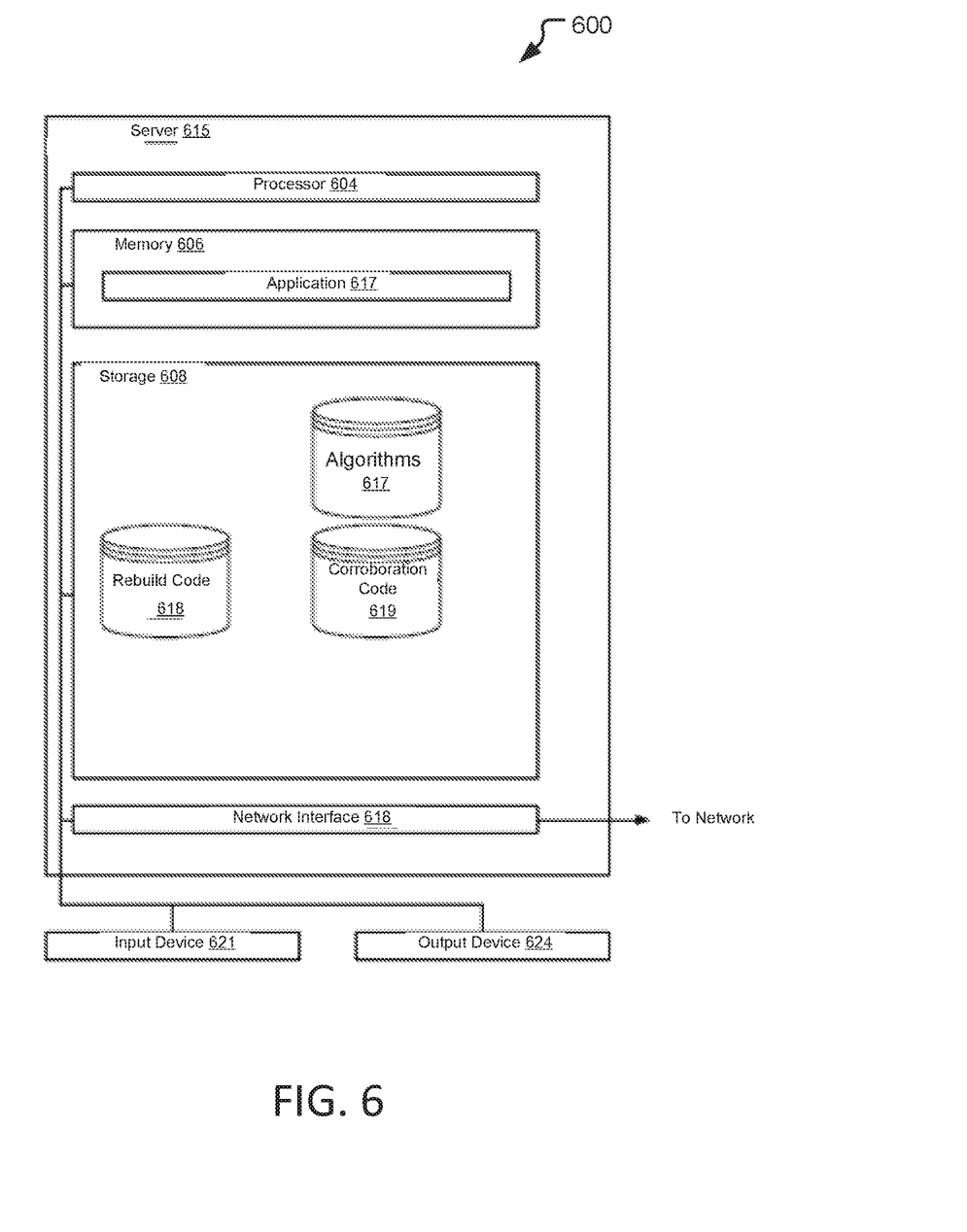
FIG. 6 further illustrates a server, such as the server of FIG. 5, according to one embodiment.

FIG. 6 further illustrates a server 615, such as the server 515 of FIG. 5, according to one embodiment. The server 615 generally includes a processor 604 connected via a bus to a memory 606, a network interface device 618, a storage 608, an input device 621, and an output device 624. The server 615 is generally under the control of an operating system. Examples of operating systems include the UNIX operating system, versions of the Microsoft Windows operating system, and distributions of the Linux operating system (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both). More generally, any operating system supporting the functions disclosed herein may be used. The processor 604 is included to be representative of a single CPU, multiple CPUs, a single CPU having multiple processing cores, and the like. Similarly, the memory 606 may be a random access memory. While the memory 606 is shown as a single identity, it should be understood that the memory 606 may comprise a plurality of modules, and that the memory 606 may exist at multiple levels, from high speed registers and caches to lower speed but larger DRAM chips. The network interface device 618 may be any type of network communications device allowing the navigation server 610 to communicate with other computers via the network 625.

The storage 608 may be a persistent storage device. Although the storage 608 is shown as a single unit, the storage 608 may be a combination of fixed and/or removable storage devices, such as fixed disc drives, solid state drives, removable memory cards, optical storage and network storage systems.

As shown, the memory 606 contains the application 614, which may be an application generally executed to take actions described herein. Storage 608 contains the algorithms 617, rebuild code 618, and corroboration code 619.

The input device 621 may provide a keyboard and/or a mouse, etc. The output device 624 may be any conventional display screen. Although shown separately from the input device 621, the output device 624 and input device 621 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of rebuilding a storage block, the method comprising:
   determining, at a storage controller, a data inconsistency in a storage array;
   communicating the data inconsistency from the storage array to a plurality of initiators;
   receiving, at the storage controller, a first rebuild sequence from a first set of the plurality of initiators;
   receiving, at the storage controller, a second rebuild sequence from a second set of the plurality of initiators, the second rebuild sequence different from the first rebuild sequence; and
   in response to determining that the first set is larger than the second set, rebuilding the storage block according to the first rebuild sequence rather than the second rebuild sequence.

2. The method of claim 1, wherein determining the data inconsistency further comprises determining the data inconsistency during a scrubbing operation.

3. The method of claim 1, wherein determining the data inconsistency further comprises determining the data inconsistency during a rebuilding operation.

4. The method of claim 1, further comprising instructing the storage controller by an initiator of the plurality of initiators to rebuild a stripe of the storage array.

5. The method of claim 4, wherein instructing the storage controller further comprises instructing the storage controller to rebuild the stripe from a specific subset of strips that belong to the stripe.

6. The method of claim 5, further comprising determining at the initiator that the subset of strips are valid.

7. A method of rebuilding a storage block, the method comprising:
- determining, at an initiator of a host, a data inconsistency in a storage array;
- generating a first rebuild option at the initiator;
- communicating the first rebuild option to a storage controller; and
- rebuilding the storage block according to the first rebuild option rather than a second rebuild option different from the first rebuild option in response to a determination that a first set of initiators that communicated the first rebuild option to the storage controller is larger than a second set of initiators that communicated the second rebuild option to the storage controller.

8. The method of claim 7, further comprising suspending an input/output (I/O) operation on the rebuilt block by the storage controller during the storage block rebuilding.

9. The method of claim 7, further comprising sending a rebuild request from the initiator to the storage controller.

10. The method of claim 7, further comprising informing, by the storage controller, the initiator of completing the rebuilding of the storage block.

11. The method of claim 7, further comprising retrying a read operation.

12. A method of rebuilding a storage block, the method comprising:
- determining a data inconsistency within a storage array, wherein the determination is made at an initiator of a host or a storage controller of the storage array;
- generating a first rebuild option at a first set of initiators of a plurality of initiators;
- generating a second rebuild option different from the first rebuild option at a second set of initiators of the plurality of initiators; and
- rebuilding the storage block according to the first rebuild option rather than the second rebuild option in response to a determination that the first set of initiators is larger than the second set of initiators.

13. The method of claim 12, further comprising initiating a lock to prevent another initiator from attempting a rebuild on the storage block.

14. The method of claim 12, further comprising suspending, by the storage controller, an input/output (I/O) operation on the rebuilt block during the storage block rebuilding.

15. The method of claim 12, further comprising removing a lock on a stripe that includes the storage block.

16. The method of claim 12, further comprising retrying a read operation.

17. The method of claim 12, further comprising informing one or more initiators of completing the rebuilding of the storage block.

* * * * *